United States Patent
Mueller

(10) Patent No.: US 9,183,234 B2
(45) Date of Patent: *Nov. 10, 2015

(54) MERGE MONITOR FOR TABLE DELTA PARTITIONS

(71) Applicant: SAP SE, Walldorf (DE)

(72) Inventor: Klaus Otto Mueller, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,380

(22) Filed: Oct. 6, 2014

(65) Prior Publication Data

US 2015/0026122 A1    Jan. 22, 2015

Related U.S. Application Data

(63) Continuation of application No. 13/332,151, filed on Dec. 20, 2011, now Pat. No. 8,856,193.

(51) Int. Cl.
*G06F 7/00* (2006.01)
*G06F 17/30* (2006.01)

(52) U.S. Cl.
CPC .......... *G06F 17/30289* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 7,007,015 B1 * | 2/2006 | Nayak | |
| 7,676,513 B2 * | 3/2010 | McSherry et al. | 707/616 |
| 8,612,180 B2 * | 12/2013 | Yan et al. | 702/186 |
| 2009/0240663 A1 * | 9/2009 | Plattner et al. | 707/3 |
| 2011/0093852 A1 * | 4/2011 | Li et al. | 718/100 |
| 2012/0036165 A1 * | 2/2012 | Driesen et al. | 707/803 |
| 2012/0317134 A1 * | 12/2012 | Bourbonnais et al. | 707/769 |
| 2013/0232176 A1 * | 9/2013 | Plattner et al. | 707/803 |

* cited by examiner

*Primary Examiner* — Hexing Liu
(74) *Attorney, Agent, or Firm* — Mintz Levin Cohn Ferris Glovsky and Popeo, P.C.

(57) ABSTRACT

At runtime first and second cost functions associated with a request for a merge of a main partition of a table with a delta partition of the table can be calculated. The first and second cost functions can respectively quantify an urgency of the merge relative to availability of system resources required to perform the merge and an urgency of the merge relative to other merges. Determining whether the merge should occur can include comparing the calculated first and second cost functions with calculations of other first and second cost functions for other merge requests of one or more other tables. If the merge should occur, a merge thread can be assigned to execute the merge, and execution of the merge by the merge thread can be commenced if at least one merge token representing system resources usable for merge operations is available.

16 Claims, 5 Drawing Sheets

MERGE MONITOR FOR TABLE DELTA PARTITIONS

CROSS REFERENCE TO RELATED APPLICATIONS

This application is a continuation application of U.S. patent application Ser. No. 13/332,151, filed on Dec. 20, 2011, titled "Merge Monitor for Table Delta Partitions" the disclosure of which is hereby incorporated by reference in its entirety.

TECHNICAL FIELD

The subject matter described herein relates to merging of delta and main partitions of database tables.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores. For example, some modern compression schemes can make use of the similarity of adjacent data to compress. To improve compression of column-based data, typical approaches involve sorting the rows.

Column-based storage typically makes searching of a table quite efficient, but at the expense of insertion speed for new records. In column-based storage, tables are generally organized in one or more main partitions and one or more delta partitions that retain insertions, deletions, changes, etc. to the data stored in the main partition(s). New records are inserted into the delta partition rather than into the main partition so that the main partition can retain a compressed structure to maximize the efficiency of searches on the data in that column. Direct insertion of new records into a compressed main partition is generally not possible because the compression changes the structure of the column. A search of the current data in the column requires traversal of the one or more main partitions followed by a traversal of the delta partition(s). As the delta partition or partitions increase in size, the search process becomes progressively less efficient as a larger and larger amount of less well-structured data in the merge partition(s) must be traversed in response to each query. Accordingly, delta partitions must be periodically merged to the main partition(s).

SUMMARY

In one aspect, a method includes calculating, at runtime, a first cost function and a second cost function associated with a request for a merge of a main partition of a table with a delta partition of the table. The table is part of a database that includes a plurality of other tables, and the request for the merge is prompted by occurrence of a merge motivation. The first cost function quantifies an urgency of the merge relative to availability of system resources required to perform the merge, and the second cost function quantifies the urgency of the merge relative to other merges. The method further includes determining whether the merge should occur, at least in part by comparing the calculated first and second cost functions with calculations of other first and second cost functions for other merge requests of one or more other tables, assigning a merge thread to execute the merge upon determining that the merge should occur, determining an availability of one or more merge tokens to assign to the merge thread, and commencing execution of the merge by the merge thread if at least one merge token is available or adding the merge thread to a merge queue to await an available merge token if the at least one merge token is not available. The one or more merge tokens represent system resources usable for merge operations.

In some variations or the current subject matter, one or more of the following features can optionally be included in any feasible combination. The second cost function can optionally be predefined for one merge motivation of a plurality of merge motivations and can optionally be based at least in part on one or more merge criteria related to the one merge motivation. The one or more merge criteria can optionally include predefined categories with user-configurable thresholds that are defined based on business knowledge of an organization using the database. The merge criteria can optionally include one or more of a size of the delta partition, an age of the delta partition since a last previous merge, a log size of the delta partition, a relation in size between the main partition and the delta partition, and a cell count of the table. The merge queue can optionally include a plurality of queued merge threads waiting execution of an associated merge. Each associated merge can optionally include an associated first cost function and an associated second cost function. The plurality of queued merges can optionally be ordered in the merge queue according to the associated first cost function and the associated second cost function for each of the merges. Each of the at least one merge token can optionally represent a unit of central processing unit capacity available to be dedicated to execution of the merge thread.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computerreadable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
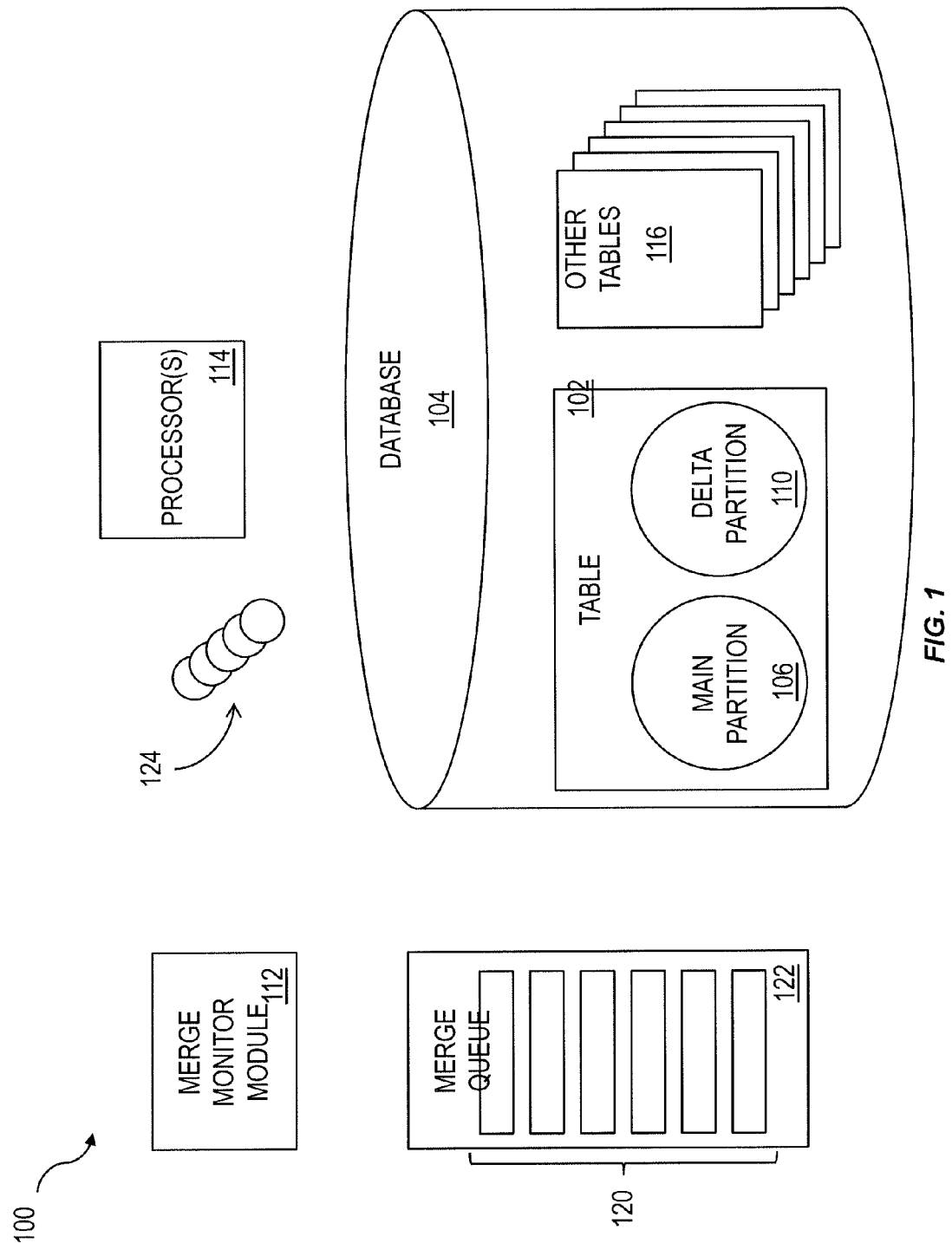
FIG. 1 is a diagram illustrating features of a merge approach consistent with at least some implementations of the current subject matter.

Deciding when to perform a merge on a table is a complex decision. Performing merges as frequently as is feasible can be advantageous. For example, search and retrieval performance typically declines as the size of the delta partition increases because it becomes necessary to traverse a progressively larger partition that is not optimized like the main partition. Also, a table is generally not available to any requesting applications during the loading of a table into memory. Loading of a table can take progressively longer as a larger delta log must be read. However, performing of a delta merge generally causes higher central processing unit (CPU) and memory consumption and produces additional disk traffic. As such, if all required merges to be performed by a system or group of systems were performed simultaneously, the available CPU and/or memory capacity could be overwhelmed. As a further consideration, the memory required to perform a merge of a main partition with its delta partition is typically on the order of twice the size of the main partition as both the original main partition and the newly formed man partition (including the newly merged records from the delta partition) are held in memory simultaneously.

In conventional approaches, the typical approach to scheduling merge functions is typically to utilize periods of reduced usage of system resources to perform merges. In modern high performance database systems, particularly those employing in-memory technology and/or networked computing or "cloud" capabilities, periods of reduced usage may be few and far between. For example, a networked application may be served to users in multiple different time zones such that "overnight" or "weekend" periods for one or more users may at least partially overlap with productive time for other users. This factor may, in addition to one or more other factors, make it difficult to administer merge calls in a complicated database management environment in which multiple applications access data and have differing needs with differing priorities for database management functions such as merges. Automatic or forced triggering of a delta merge without consideration of the overall demand on a database management system or architecture can present difficulties in that the automatic triggering may occur at a time when insufficient system resources are available or the disruptions caused by the merge are otherwise inconvenient or even unacceptable.

A system or set of linked systems (hereinafter simply referred to as a "system"), which can include one or more processors (e.g. central processing units or CPUs) either running individual processes or virtual machines, can implement database management features such as those described herein. Such database management features can include execution of merges of delta partitions into main partitions for a plurality of tables that can be associated with one or more database applications or other software components that use data stored in the plurality of tables.

One or more merge motivations can be considered in determining whether to perform a merge and also when to perform such merges. For example, a delta merge can be required or triggered from time to time dependent on various metrics, including but not limited to the size of the delta partition, current CPU utilization and/or memory usage, or the like. A merge can be automatically triggered when an agent or routine identifies one or more tables with delta partitions larger than a predefined threshold size and/or when a threshold amount of time has elapsed since a last merge was executed for a table. For example, a system process can periodically (or continuously, semi-continuously, on occurrence of certain events, etc.) check the list of index server locally loaded column store tables. This system process can decide based on several criteria if and when to merge the delta partition into the main index. It does not need to unload attributes and does not need to inform about memory consumption and free memory size.

Alternatively, a hard merge motivation can be one in which an merge is explicitly and directly called, for example via an internal administrator application programming interface (API) merge call or by a SQL (or other database management language) merge call. Hard merge calls generally request that the merge be performed as soon as possible regardless of circumstances. A smart merge can be one in which an application requests that the system check whether a merge of a table main partition and delta partition should advantageously be done now. A forced merge is a type of hard merge in which the merging of the delta into the main partition must be performed independent or the size of the delta partition, system resource availability, or the like. A conditional merge can be a request that a table main and delta partition be merged if one or more merge criteria indicate a current or pending need for the merge, if there are sufficient system resources to perform the merge, and if there are no other pending merge requests with higher priority.

In general, a database application or other data consuming or producing application need not be concerned with the internal processes required to perform a delta merge. Such applications can, however, provide support to assist the system in making decisions regarding appropriate scheduling and ordering of multiple required merge operations. For example, an application can in some implementations send a merge hint to the system, for example after a bulk insert or when the application expects to not require heavy usage of a table. This kind of information, which may not otherwise be available to the system, can be important in determining whether and when to perform a series of merges. In a single application system supported by a dedicated database management program, a system can readily receive such application hints, perform a check of the table delta partition size, and perform the hinted merge if it is both necessary and reasonable within current operating condition restraints. If not, the system can simply ignore the hint.

In a more complex system, for example a database management system supporting multiple features of an enterprise resource planning (ERP) program or other business software, many column store tables can be located on a single host system (or virtual machine). In many real-world cases, the system or host is unlikely to be capable of merging all or even many of these tables simultaneously. A decision regarding whether and when to merge a single table should therefore take account of the status of other tables administered by the system. As such, in implementations of the current subject matter, cost functions can be applied to decide which table to merge and when to merge. Additional cost functions can also be used to control how many tables are merged at the same time and how many processing threads are used to merge a single table.

To address one or more of these issues and/or other challenges presented by currently available technology, one or more implementations of the current subject matter can, among other possible advantages, provide merge monitoring and scheduling functionality that supports control of parallel merge requests for local column tables from a host global point of view.

A merge monitor module or other computer-implemented functionality can be employed to control merge requests for all local column tables from a host global point of view. In an implementation, table merge requests generated both by applications and by system maintenance programs can be received by the merge monitor module and assigned one or more merge tokens. Receipt of a merge token can be considered as permission to commence a merge.

A merge request thread can be blocked by the merge monitor module under certain conditions, for example if insufficient system resources are available or if a same table is already scheduled for a merge in another existing thread. Depending on current system resource consumption, merge motivation, cost functions, merge criteria, and optionally one or more other factors, a merge monitor module can allow execution of single requesting merge threads and can unblock waiting threads.

Depending on current system resource usage, more table merge requests may be pending that the system can currently handle. Generally, when CPU load and memory consumption are lower, more table merge requests can be completed. Consistent with implementations of the current subject matter, a merge monitor module can issue a certain number of merge tokens. One token can represent one merge thread. A load balancing cost function can determine the actual number of available merge tokens. The number of merge tokens can be adjusted according to the current availability of resources within the system and can be recalculated periodically by the system.

In implementations of the current subject matter a merge request needs to acquire at least one merge token before the merge process for that merge request can commence. If no merge tokens are currently available, any new merge request can be required to wait to receive a merge token as designated by the merge monitor module. This can occur if the merge monitor module detects additional free system resources that can be directed to merge operations or if tokens representing system resources currently directed to completion of merge requests are released due to the completion of a prior merge request.

When system resources are highly available, for example in case of a low CPU load and/or low memory consumption, more table merge requests can be completed, either more rapidly in sequence, or with more being performed in parallel. In some cases, the number of pending merge requests can exceed the number of available merge threads due to one or more factors such as a high number of new merge requests, configuration settings, and current CPU load and memory consumption.

Merge requests can compete for available merge tokens. In this manner, merge requests can be queued by according to one or more scheduling rules. For example, hard merge requests can be ranked before smart merge requests, and smart merge requests can be ranked before auto merge requests. Merge requests with a same (or similar) merge motivation can be sorted according to their calculated cost function, with top priority merge candidates being in line for earlier merging. At times when no merge threads remain in the queue, a new merge request can be handled immediately by immediately assigning a merge token to the merge thread tasked to handle the merge request.

Merge requests can be called via an administrator API as discussed above. When this occurs, one or more checks can be completed. For example, local tables can be merged on the index server instance. Merge calls for remote tables can be routed to the other index server instance over the network. If the table being merged is local, a new merge request can be created. The new merge request can then acquire one or more merge tokens from the merge monitor module. If all system resources for merge are currently occupied taken, the merge request thread can be queued into the merge monitor module's merge request queue. The merge request thread can be required to wait before proceeding with the queued merge requests if other requests with higher priority also try to acquire a token.

The merge monitor module can allow processing of merge requests from the merge request queue according to an amount of currently available system resources for merge operations. Merge requests in the queued are then handled according to a priority ranking During wait times (e.g. when no system resources are available to commence additional merge threads, the metrics associated with a table can change and thereby influences the table merge costs. The merge request priority of merge threads in the queue can then be dynamically updated, continuously, semi-continuously, periodically, etc. The priority cost function for merge threads associated with the changed table can be recalculated while the merge thread is waiting.

The merge monitor module can limit the number of parallel merge threads over all tables. For example, for every thread to be started the merge monitor module can issue a merge token. The number of available merge tokens can be recalculated periodically. In one example, the system can calculates the number of merge tokens by default from current free CPU and number of cores. At any time only a limited number of parallel merge threads may be allowed to run. This number of merge threads can be equivalent to the number of merge tokens issued. Free merge tokens can be given to waiting non-blocked merge requests with highest priority.

In some implementations, forced merges can require consideration of neither merge costs nor system utilization. For forced merges the table can instead be merged immediately, even if the table is merged by another merge call or request. Smart merges and automatic merges can also be given elevated priority, although a lower priority than forced merges. During execution of the queued merge threads, it is possible that one or more conditions, etc. that triggered automatic merges or smart merges can change. In some examples, such changes can result in the table not any longer being eligible for execution of a merge in accordance with a queued merge thread. To account for this possibility, the merge decision function can in some implementations be recalculated upon acquisition of a merge token by a queued merge thread. In this manner, before starting actual execution of the merge operation, the merge decision function is recalculated to verify that the conditions leading to its current priority ranking in the queue as well as the decision to execute the merge remain valid.

In another example, two different merge requests can be received for the same table. In such a case, the merge monitor module can block the second request for as long as the merge thread for the first merge request is in the process of being executed. The second merge request can be unblocked if the merge thread for the first merge request is canceled or otherwise fails to complete.

Different levels of concurrency can be relevant to delta merges. For example, different tables and different parts of the same table can be merged in parallel. For hard, smart, and forced merge calls of a spilt table, a dedicated merge request can be started for all of the data partitions across which the table has been split. A merge motivation can be inherited for actions at each partition from the original merge call. Automatic merges can be triggered for partitions individually. In another type of concurrency, different attributes of a same table or partition can be merged in parallel. Alternatively or in addition, certain merge steps for a single attribute can be executed in parallel. The merge monitor module can control concurrency by issuing merge tokens, for example as discussed elsewhere herein.

There are a couple of gadgets to monitor The merge monitor module can include additional functionality, including but not limited to tracing, logging, monitoring views, and the like. Merge related traces can be switched. Ongoing table delta merge requests can be listed as a monitoring view, for example listing information relevant to one or more table delta merge requests. Examples of such information can include, without limitation, one or more of a table name, a merge request start date and/or time, a merge progress indicator, a column name, a data type, a schema name, partition name, an identification of the merge motivation, an external identifier for a table merge called by an application, and the like. Merges can be logged and can be listed per a monitoring view, which can optionally include one or more units of table delta merge information such as a table name, a merge start time, a merge duration, etc. In addition to table delta merges, calls to optimize table compression can also be listed. Merge latency reports can include the time (e.g. microseconds or some other applicable unit) that a merge request waited to receive a merge token so that the merge thread can be executed.

There are many different application scenarios possible for cost functions. For different scenarios, one or more cost function can be more advantageous than others. Some cost functions will be optimized for dedicated customer scenarios. Cost functions consistent with implementations of the current subject matter can be defined easily by system administration, by a calling application, etc. Various cost functions can be defined by configuration and can even be changed dynamically during system runtime. The merge monitor module or, alternatively or additionally, other components of the system can provide default cost functions.

Cost function parameters can include, but are not limited to one or more of a database management system delta memory size, a table merge delay, a main row count, a delta logsize, a delta cell count, a delta row count, a queuing delay wait, table name, schema name, a CPU load average, a logical CPU count, a total heap memory, an available heap memory (including memory which could be freed), and the like. One or more of these parameters can be used in various implementations to build cost functions related to tables, like all table merge decision and priority functions including non table related parameters, like CPU load average or memory consumption.

For automatic merges, in some implementations a table may be merged only under certain conditions, for example if its delta partition memory size exceeds a threshold (e.g. 1 GB), if it was not merged in longer than a threshold amount of time (e.g. an hour), if its cell count exceeds a threshold size (e.g. 800), if its delta log size is bigger than a threshold (e.g. 5 GB), etc. The system (e.g. the merge monitor module) can be set to always check whether the delta partition of a table is empty or not before triggering an automatic merge. If the delta partition contains no entries, the automatic merge can be blocked.

In some implementations, cost functions that are not table related, such as for example load balancing functions, etc. can be built only from parameters that are not table related. As a default, if no actual priority cost function is defined, the merge monitor module can optionally assign the index delta merge priority according to standard default cost functions. In the examples of case of smart merges and automatic merges, the default function can calculate a priority according to one or more of the index delta engine memory size, cell count, merge delay, or the like. In another example, relatively small indexes that do not a substantial resource allocation to be merged can be given preferential priority by the merge monitor module.

FIG. 1 shows an features of a exemplary system architecture 100 illustrating one or more features consistent with implementations of the current subject matter. A table 102 organizing data within a database 104 includes a main index or main partition 106 and a delta partition 110 that retains insertions, changes, deletions, etc. relative to a state of the main partition as of the most recent merge of the delta partition 110 with the main partition 106. A merge monitor module 112 decides whether the delta partition 110 and the main partition 106 should be merged in response to merge request. The determination is based on input criteria relating to one or more processors 114 available for execution of merges as well as an urgency of the merge relative to an availability of system resources cost (e.g. memory usage, CPU resources, etc.) required to perform the merge (as quantified by a first cost function) and an urgency of the merge motivation underlying the merge request relative to urgencies of merges of other tables 116 that have been requested (as quantified by a second cost function). A merge thread 120 is created for each merge to be executed and retained in a merge queue 122 in a ranking based on the first and second cost functions for each merge, which are calculated as described elsewhere herein. Merge tokens 124 that represent available system resources for executing a merge thread are assigned to the queued merge threads 120 as they become available (e.g. by more system resources becoming available or by currently in-progress merges being completed.

Figure 2:
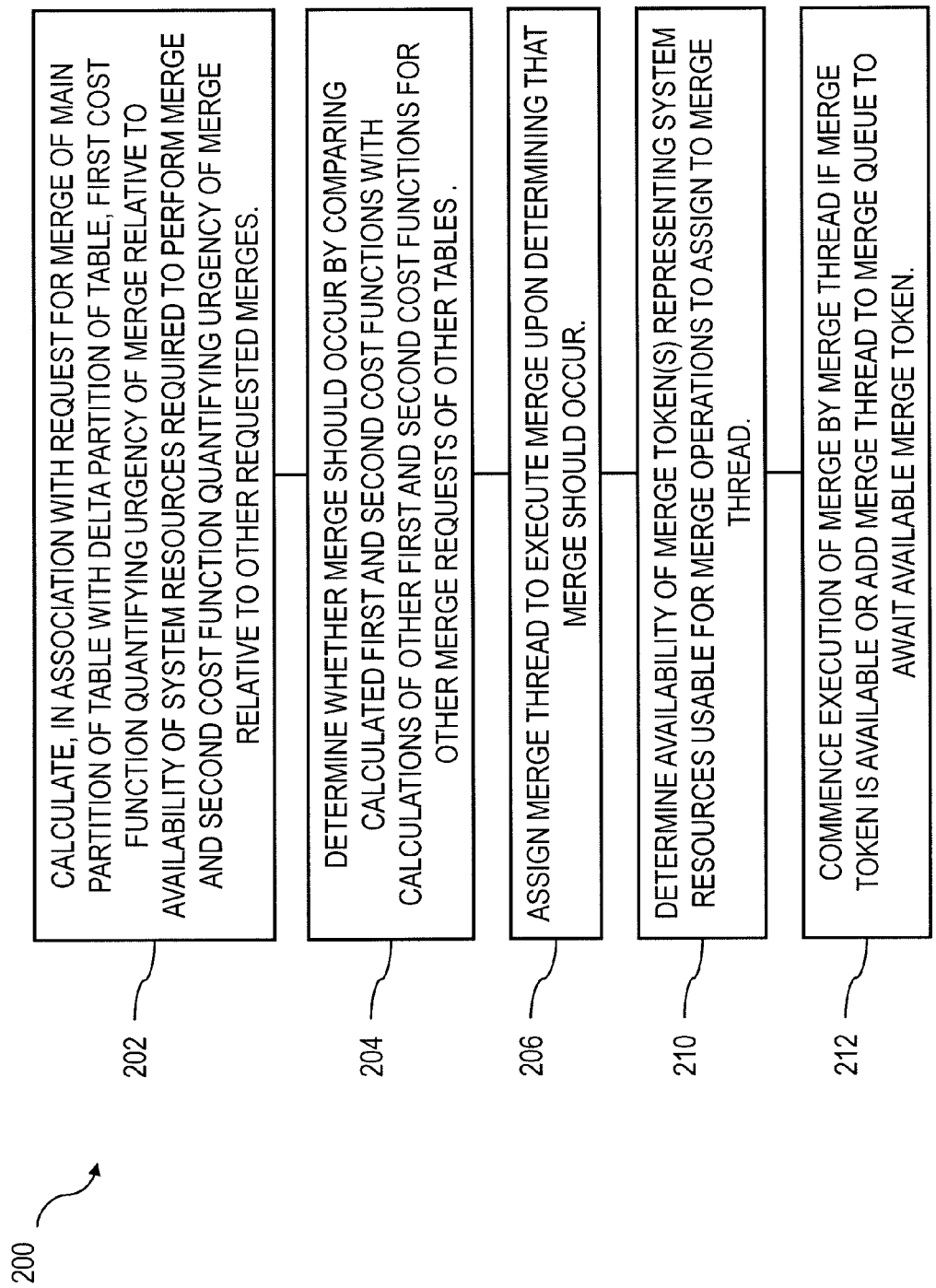
FIG. 2 is a process flow diagram illustrating aspects of a method having one or more features consistent with at least some implementations of the current subject matter.

FIG. 2 shows a process flow chart 200 illustrating method features, one or more of which can be included in implementations of the current subject matter. At 202, in association with a request for a merge of a main partition of a table with a delta partition of the table, a first cost function quantifying an urgency of the merge relative to availability of system resources required to perform the merge and a second cost function quantifying an urgency of the merge relative to other merges are calculated at runtime. The table is part of a database that includes a plurality of other tables. The request for the merge can have been prompted by occurrence of a merge motivation. As the delta partition increases in size, the necessity to merge the table increases so that search performance on the table does not decline. Additionally, as the delta increases in size, the resources required to merge the table also increase.

At 204, a determination is made whether the merge should occur, for example by comparing the calculated first and second cost functions with calculations of other first and second cost functions for other merge requests of one or more other tables in the database or otherwise administered by a merge monitor module or comparable functionality. Upon determining that the merge should occur, at 206 a merge thread is assigned to execute the merge. An availability of one or more merge tokens to assign to the merge thread is determined at 210. The one or more merge tokens represent system resources usable for merge operations. At 212, execution of the merge by the merge thread is commenced if at least one merge token is available. Otherwise, the merge thread is added to a merge queue to await an available merge token if the at least one merge token is not available.

Figure 3:
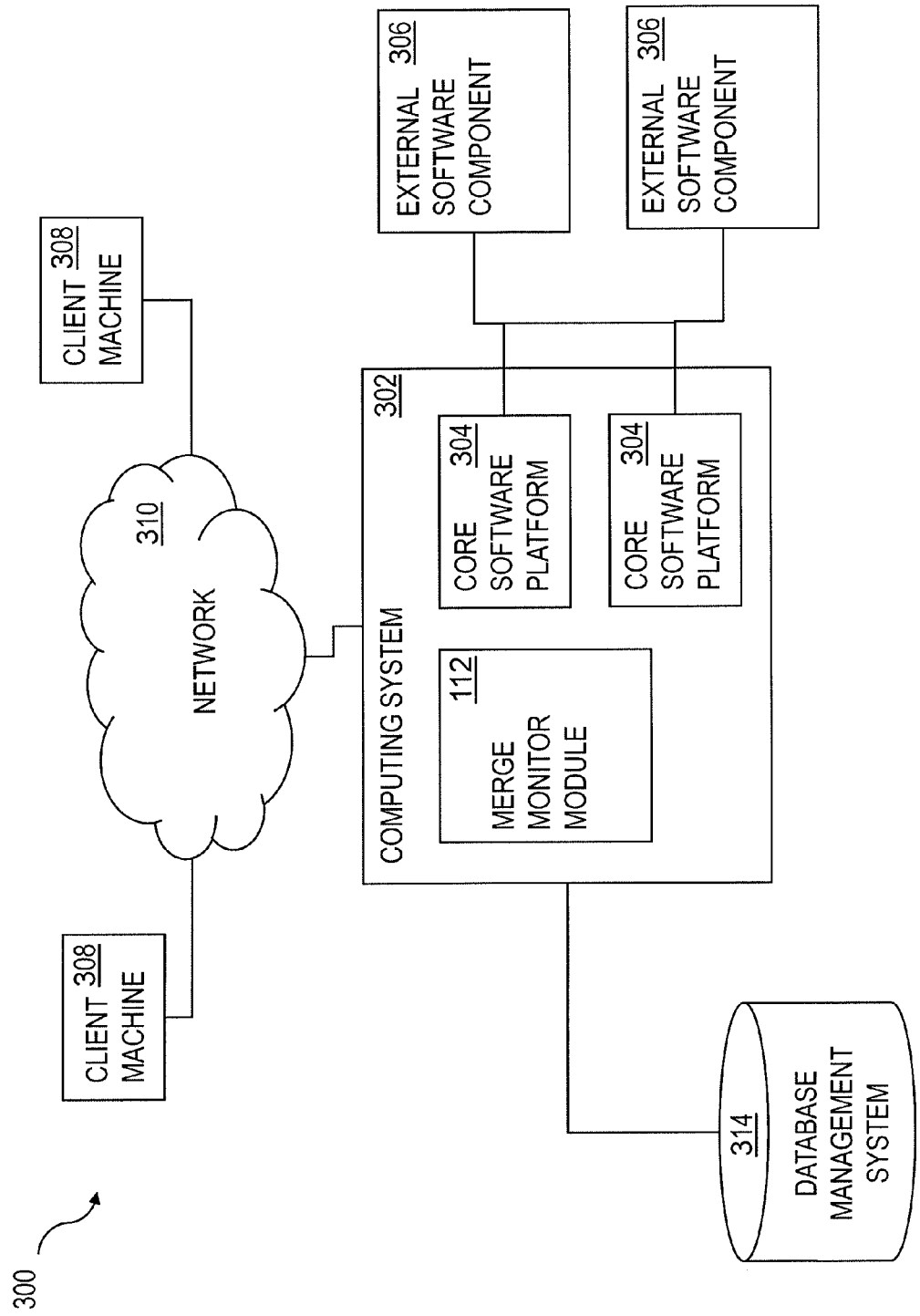
FIG. 3 is a diagram illustrating features of a business software system architecture consistent with at least some implementations of the current subject matter.

Consistent with some implementations of the current subject matter, the core software platform of an enterprise resource planning (ERP) system, other business software architecture, or other data-intensive computing application or software architecture can be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 3 shows a diagram of a system consistent with such an implementation. A computing system 302 can include one or more core software platform modules 304 providing one or more features of the business software system. The computing system can also aggregate or otherwise provide a gateway via which users can access functionality provided by one or more external software components 306. Client machines 308 can access the computing system, either via a direct connection, a local terminal, or over a network 310 (e.g. a local area network, a wide area network, a wireless network, the Internet, or the like).

A merge monitor module 112 or other comparable functionality can access a database management system 314 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 314 can include parallelization features consistent with those described herein.

Figure 4:
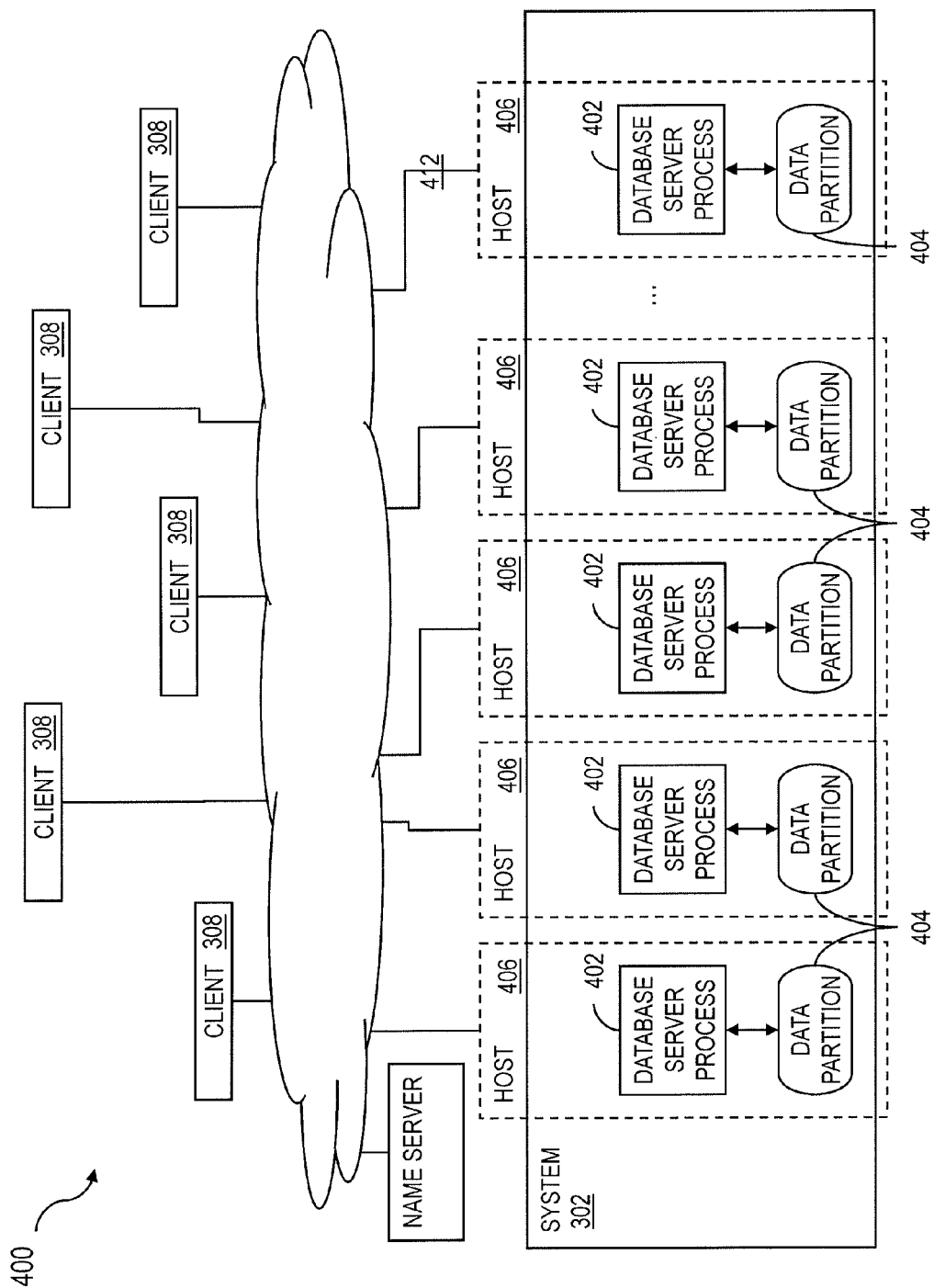
FIG. 4 is a diagram illustrating features of a database management system architecture consistent with at least some implementations of the current subject matter.

For data distribution purposes, tables or ranges within tables can be assigned to different database partitions that are assigned to different hosts, for example for scalability reasons. FIG. 4 shows an example of an enterprise resource system architecture 400 consistent with an implementation that includes data distribution for scalability reasons. Such a configuration can be used for large, on-premise or standalone systems with high performance requirements. Each data server process 402 and its associated data partition 404 can be assigned to a discrete host 406. A host 406 can be a standalone machine with one or more physical processors or a virtual machine on a larger system 302 as depicted in FIG. 4. A central component, labeled as a name server 412 in FIG. 4, knows the topology of the system and how data is distributed. In a system with data distribution, the name server knows which tables or partitions of tables are located on which data server process 402. One or more clients 414 (e.g. client machines 308) can access the name server 412, either via a direct connection or over a network 416.

In a data distribution scenario, the partitioning can be done table wise or also by splitting tables. With table wise partitioning, the name server assigns new tables to a database server process 402 based on the current distribution of tables (number of tables assigned to each database server process 402). Then data for this table will reside only on that database server process 402. It is also possible to specify that a table is split over multiple database server processes 402. The name server 412 can optionally partition the table based on a size estimation specified by the application. When records are inserted into a split table, the records can be distributed to other database server processes 402 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
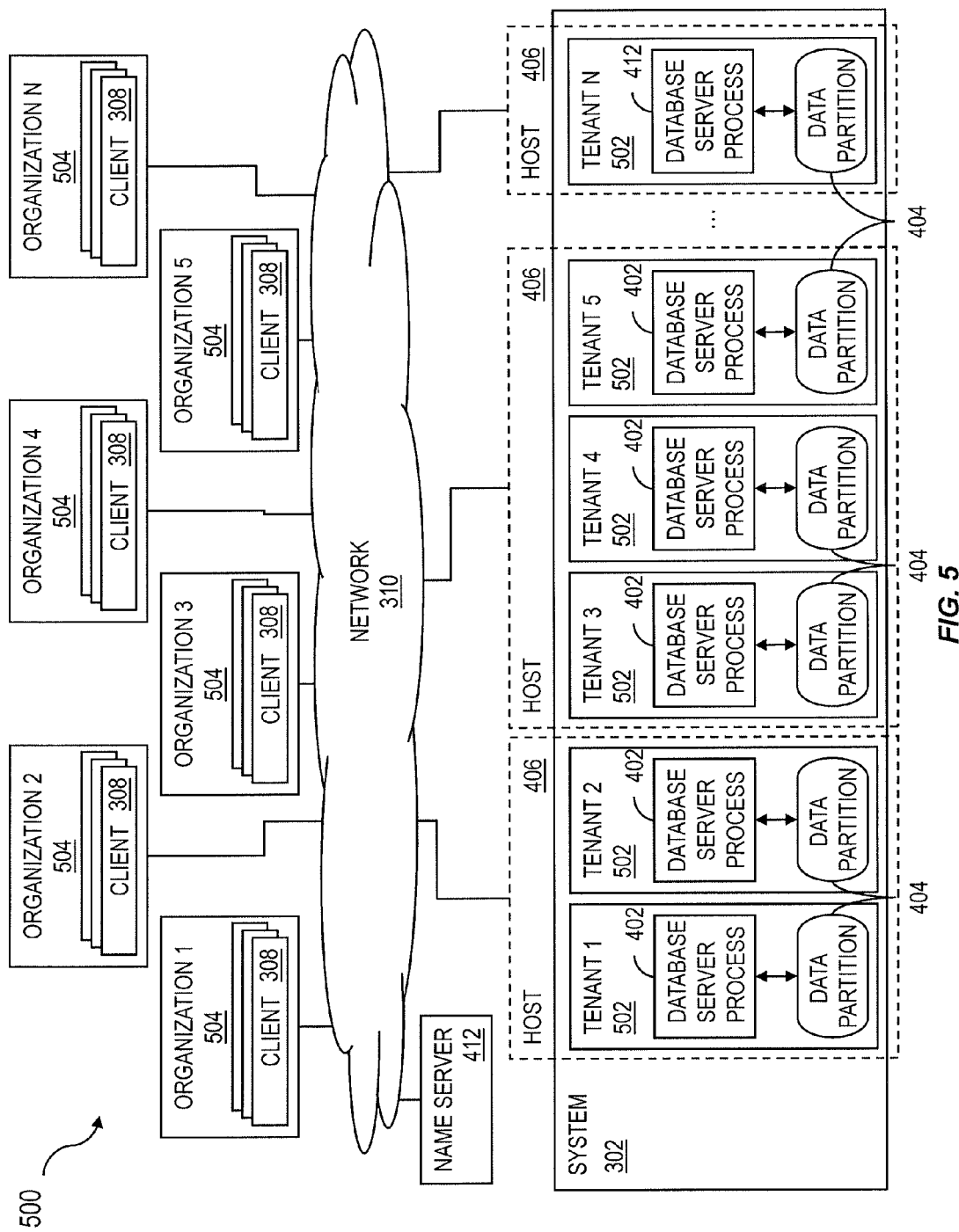
FIG. 5 is a diagram illustrating features of another database management system architecture consistent with at least some implementations of the current subject matter.

Data partitioning consistent with implementations of the current subject matter can also be used in a multi-tenancy environment as illustrated in the system architecture 500 of FIG. 5. Multiple tenants 502, each isolated from one another and available to be accessed by clients 414 within a separate organization 504 of a plurality of organizations via a network 416, can be hosted by a same host 406, which can be a virtual machine on a larger system 302 as shown in FIG. 5 or a separate system that includes one or more physical processors. Tenants 502 can also optionally be distributed across multiple database server processes 402 on more than one host 406. In this manner, tables or ranges within tables are assigned to different database server processes 402 that are assigned to different hosts 406 for scalability reasons. One or more tenants 502 can alternatively be served by a single database server process 402 accessing a data partition 404 (or multiple data partitions 404) for the respective tenant 502 that is isolated from other tenants 502.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by at least one programmable processor, cause the at least one programmable processor to perform operations comprising:
   determining whether a merge of a main partition of a table with a delta partition of the table should occur, the determining comprising comparing a calculated first cost function and a second cost function with calculations of other first and second cost functions for other merge requests of one or more other tables, the calculated first and second cost functions being associated with a request for the merge of the main partition of the table with the delta partition of the table;
   assigning, upon determining that the merge should occur, a merge thread to execute the merge;
   determining an availability of one or more merge tokens to assign to the merge thread, the one or more merge tokens representing system resources usable for merge operations; and
   commencing execution of the merge by the merge thread if at least one merge token is available or adding the merge thread to a merge queue to await an available merge token if the at least one merge token is not available.

2. A computer program product as in claim 1, wherein the second cost function is predefined for one merge motivation of a plurality of merge motivations and is based at least in part on one or more merge criteria related to the one merge motivation.

3. A computer program product as in claim 2, wherein the one or more merge criteria comprise predefined categories with user-configurable thresholds based on business knowledge of an organization using the database, and wherein the merge criteria comprise one or more of a size of the delta partition, an age of the delta partition since a last previous merge, a log size of the delta partition, a relation in size between the main partition and the delta partition, and a cell count of the table.

4. A computer program product as in claim 1, wherein the merge queue comprises a plurality of queued merge threads waiting execution of an associated merge, each associated merge having an associated first cost function and an associated second cost function, the plurality of queued merges being ordered in the merge queue according to the associated first cost function and the associated second cost function for each of the merges.

5. A computer program product as in claim 1, wherein each of the at least one merge token represents a unit of central processing unit capacity available to be dedicated to execution of the merge thread.

6. A system comprising:
   at least one programmable processor; and
   a non-transitory machine-readable storage medium storing instructions that, when executed by the at least one processor, cause the at least one programmable processor to perform operations comprising:
   determining whether a merge of a main partition of a table with a delta partition of the table should occur, the determining comprising comparing a calculated first cost function and a second cost function with calculations of other first and second cost functions for other merge requests of one or more other tables, the calculated first and second cost functions being associated with a request for the merge of the main partition of the table with the delta partition of the table;
   assigning, upon determining that the merge should occur, a merge thread to execute the merge;
   determining an availability of one or more merge tokens to assign to the merge thread, the one or more merge tokens representing system resources usable for merge operations; and
   commencing execution of the merge by the merge thread if at least one merge token is available or adding the merge thread to a merge queue to await an available merge token if the at least one merge token is not available.

7. A system as in claim 6, wherein the second cost function is predefined for one merge motivation of a plurality of merge motivations and is based at least in part on one or more merge criteria related to the one merge motivation.

8. A system as in claim 7, wherein the one or more merge criteria comprise predefined categories with user-configurable thresholds based on business knowledge of an organization using the database, and wherein the merge criteria comprise one or more of a size of the delta partition, an age of the delta partition since a last previous merge, a log size of the delta partition, a relation in size between the main partition and the delta partition, and a cell count of the table.

9. A system as in claim 6, wherein the merge queue comprises a plurality of queued merge threads waiting execution of an associated merge, each associated merge having an associated first cost function and an associated second cost function, the plurality of queued merges being ordered in the merge queue according to the associated first cost function and the associated second cost function for each of the merges.

10. A system as in claim 6, wherein each of the at least one merge token represents a unit of central processing unit capacity available to be dedicated to execution of the merge thread.

11. A computer-implemented method comprising:
    determining whether a merge of a main partition of a table with a delta partition of the table should occur, the determining comprising comparing a calculated first cost function and a second cost function with calculations of other first and second cost functions for other merge requests of one or more other tables, the calculated first and second cost functions being associated with a request for the merge of the main partition of the table with the delta partition of the table;
    assigning, upon determining that the merge should occur, a merge thread to execute the merge;
    determining an availability of one or more merge tokens to assign to the merge thread, the one or more merge tokens representing system resources usable for merge operations; and
    commencing execution of the merge by the merge thread if at least one merge token is available or adding the merge thread to a merge queue to await an available merge token if the at least one merge token is not available.

12. A computer-implemented method as in claim 11, wherein the second cost function is predefined for one merge motivation of a plurality of merge motivations and is based at least in part on one or more merge criteria related to the one merge motivation.

13. A computer-implemented method as in claim 12, wherein the one or more merge criteria comprise predefined categories with user-configurable thresholds based on business knowledge of an organization using the database, and wherein the merge criteria comprise one or more of a size of the delta partition, an age of the delta partition since a last previous merge, a log size of the delta partition, a relation in size between the main partition and the delta partition, and a cell count of the table.

14. A computer-implemented method as in claim 11, wherein the merge queue comprises a plurality of queued merge threads waiting execution of an associated merge, each associated merge having an associated first cost function and an associated second cost function, the plurality of queued merges being ordered in the merge queue according to the associated first cost function and the associated second cost function for each of the merges.

15. A computer-implemented method as in claim 11, wherein each of the at least one merge token represents a unit of central processing unit capacity available to be dedicated to execution of the merge thread.

16. A computer-implemented method as in claim 11, wherein at least one of the determining whether a merge of a main partition of a table with a delta partition of the table should occur, the assigning, the determining the availability of the one or more merge tokens, and the commencing are performed by at least one programmable processor.

\* \* \* \* \*